July 28, 1936.  R. H. HERRON  2,049,296
WEIGHING SCALE
Filed July 26, 1934   2 Sheets-Sheet 1
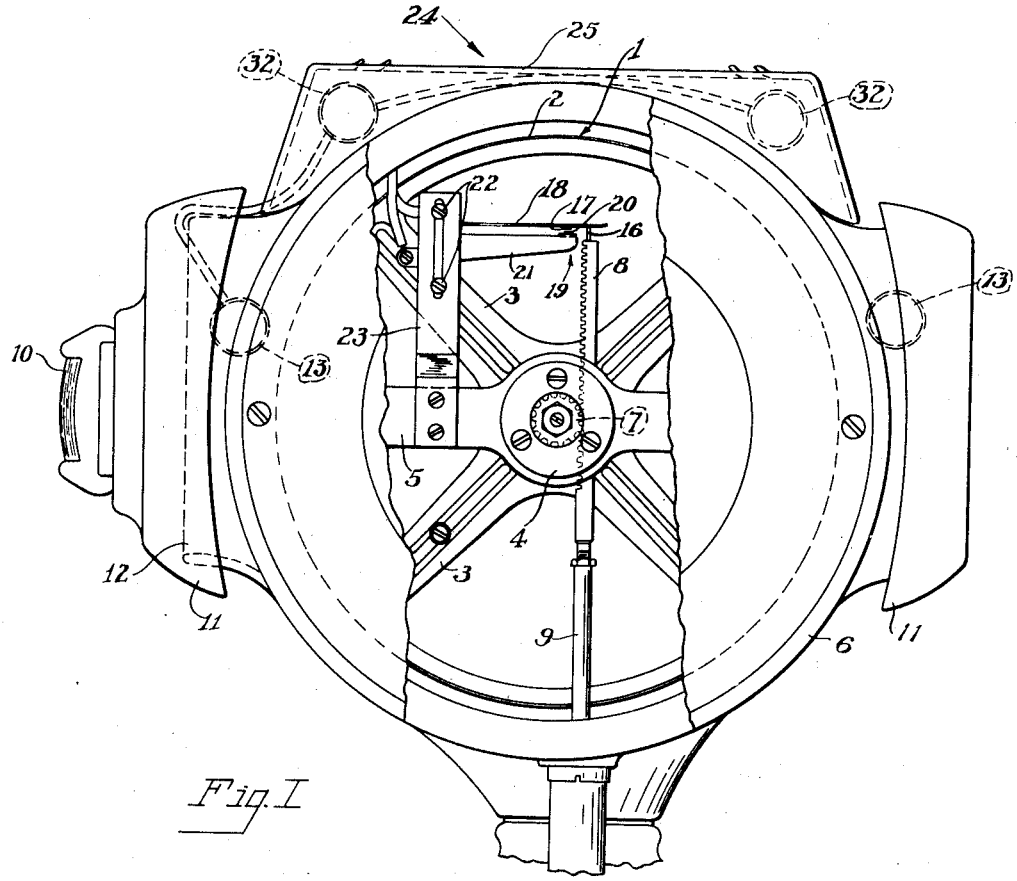
Fig. I
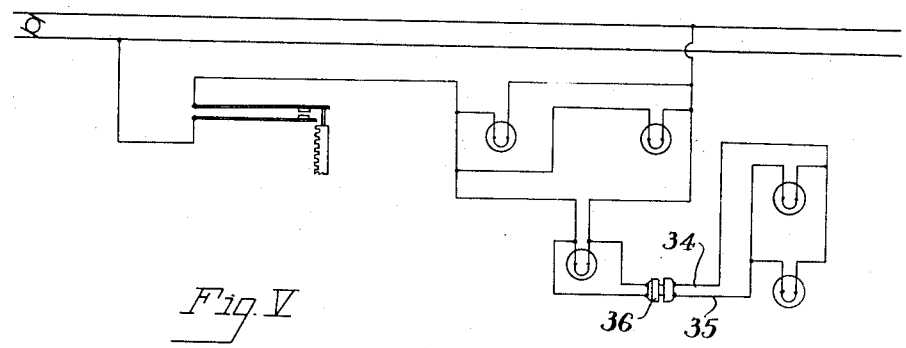
Fig. V
Richard H. Herron
INVENTOR
BY
ATTORNEY July 28, 1936.   R. H. HERRON   2,049,296
WEIGHING SCALE
Filed July 26, 1934   2 Sheets-Sheet 2
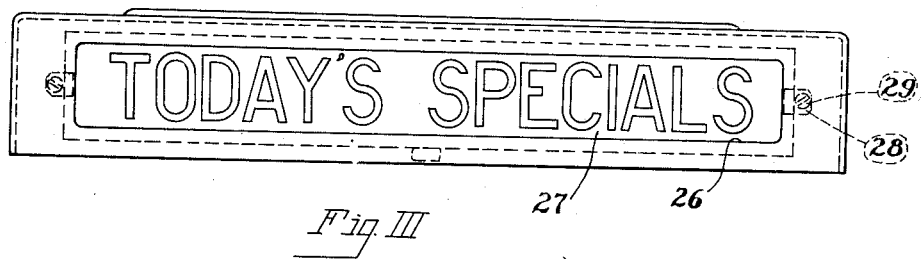
Fig. III
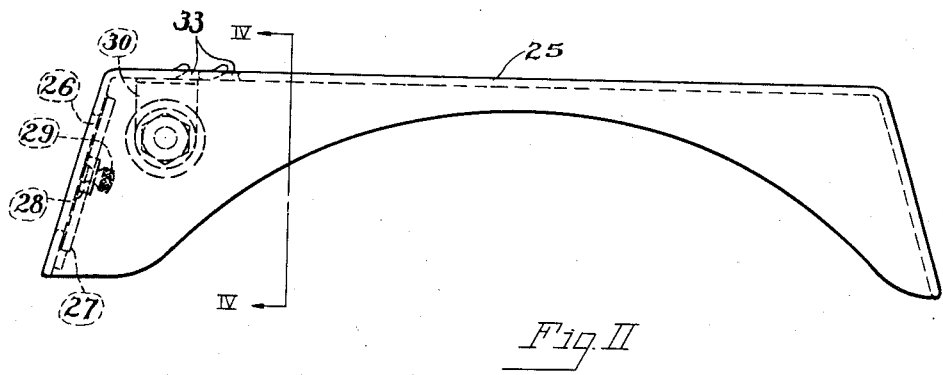
Fig. II
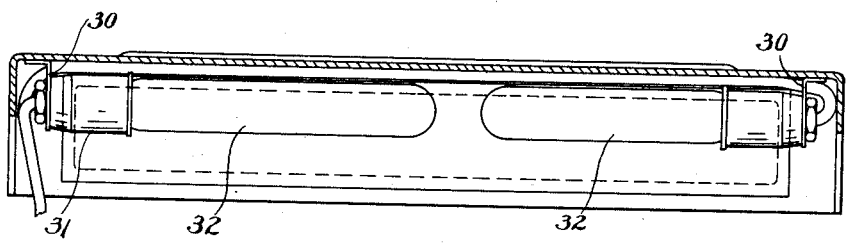
Fig. IV
Richard H. Herron
INVENTOR
BY
ATTORNEY Patented July 28, 1936

2,049,296

UNITED STATES PATENT OFFICE 2,049,296

WEIGHING SCALE

Richard H. Herron, Toledo, Ohio, assignor to Toledo Scale Manufacturing Company, Toledo, Ohio, a corporation of New Jersey Application July 26, 1934, Serial No. 736,991

2 Claims. (Cl. 240—2.11)

My invention relates generally to weighing scales and more particularly to equipment auxiliary to weighing scales for displaying articles.

The most valuable space in a retail shop for display purposes is the space immediately in the vicinity of the weighing scale, as it is usual for the customer to follow the clerk to the scale and watch the weighing operation, thus more persons are apt to see articles displayed there than at any other place in the shop.

The principal object of my invention is, therefore, the provision of means for displaying articles on the scale.

Another object is the provision of improved means for displaying such articles in a position adjacent the customer's indication.

Another object is the provision of means for displaying illuminated signs which are readily interchangeable.

Still another object is the provision of improved means for illuminating such articles displayed; and, A still further object is the provision of improved means for controlling the illumination of the articles displayed by means of the weighing scale.

These, and other objects and advantages, will be apparent from the following description in which reference is made to the accompanying drawings, illustrating a preferred embodiment of the invention, wherein similar reference numerals designate similar parts throughout the several views.

In the drawings:—

Figure I is an end elevational view of a conventional cylinder scale head showing my improved display device in position; a portion of the scale head being broken away to more clearly show the illumination control switch and its operating means.

Figure II is an end elevational view of the display device embodying my invention.

Figure III is a front elevation thereof.

Figure IV is a cross sectional view taken substantially along the line 4—4 of Figure II; and, Figure V is a diagram of the electrical circuit.

The embodiment of my invention is adapted to be used with many different types of scales. I have shown it in combination with a scale of the so called cylinder type. This type of scale being fully disclosed and described in U. S. Patent 1,714,623 to O. C. Reeves, therefore, I will describe it herein only to such extent as is necessary to fully disclose this invention.

Referring to the drawings in detail:—

The indicating means located within the head of the scale, shown in Figure I, consists of a rotary cylindrical chart (1) comprising an enveloping sheet (2), on which weight and value indicia are printed, which is supported by plurality of light metallic frames (3) fixed to a longitudinally extending shaft (not shown), fulcrumed in ball bearings situated in housings (4) fastened to brackets (5), extending transversely across the open end of a hollow cylindrical chart casing (6) adapted to enclose and house the chart (1).

Scales of the type shown herein are adapted to indicate the weight and value of a commodity weighed, this is accomplished in that the chart is rotated through an angle which is proportional to the weight of the load. To accomplish this, a pinion (7) is fixed on the chart shaft, adjacent one of its ends, in a position so that its teeth engage teeth of a rack (8) adjustably secured to the end of a vertically extending rod (9) whose lower end is pivoted to a movable part of the load counterbalancing mechanism of the scale (not shown), the diameter of the pitch of the pinion is so calculated that for the movement of the load counterbalancing mechanism of the scale from zero to full capacity the chart will make substantially one revolution, and its movement for a load weighing less than the capacity of the scale, will be in direct proportion.

The weight and value indications presented by the chart (1) are visible through windows (10) provided in frames (11) which cover the opening (12) in the front and back of the chart casing (6). In the scale of the type herein shown electric lamps (13) are provided. These are situated within the casing immediately above that portion of the chart which displays the indications to the merchant and the customer and visible through the windows (10), for the purpose of illuminating the indicia and enhancing their legibility. Generally, and also in the scale herein shown, the operation of these lamps is timed and controlled by the weighing scale, they are energized when an article is placed on the scale to be weighed, and continue to remain in this condition until the article is removed. The purpose of this intermittent illumination is twofold, to conserve electricity, consuming it only at the time when light is actually needed, but mainly to call the customer's attention to the weighing operation by the suddenly appearing light.

When a commodity is placed on the load receiver of the scale the rack (8) moves downwardly, since the rod to which it is attached (9)

is operatively connected to part of the load counterbalancing mechanism, which has a downward movement when a load is applied and a pin (16), made of dielectric material, studded into the end of rack (8) permits a contact point (17), secured to a flexible switch arm (18) of a make and break switch (19), to engage a contact point (20) fixed in an inflexible arm (21). The switch (19) being adjustably secured by screws (22) to a plate (23) fastened to the transversely extending brackets (5). The engagement of the contact points closes an electric circuit energizing the lamps (13) and thus illuminating the chart (1).

As herein before stated, customers in a shop will follow the clerk to the scale and since the scale illumination draws the customer's attention to the indication I have provided a display fixture (24) to be placed on top of the scale immediately above the indicating opening (10) so that the eyes of the customer must invariably fall upon any articles which are displayed thereon. The display fixture (24) shown herein comprises a flat top (25), and downwardly extending sides, the bottom edges of these sides are shaped to match the contour of top of the casing (6) so that when placed thereon it rests firmly and its flat top forms a surface admirably adapted for display purposes.

For the purpose of conveying a message to the customer concerning the articles displayed on my improved display fixture, I have provided a window (26) on the customers' side and a translucent plate (27) of glass or other material on which appropriate wording may be painted or printed. Since the fixture (24) is not fastened to the casing the plate (27) is readily accessible and being held in place only by clips (28) and thumb screws (29) it may be interchanged without difficulty.

Immediately back of the window (26) and depending from the top (25) are brackets (30) which support sockets (31) in which lamps (32) are screwed. A series of louvres (33) are provided in the flat top (25), which are positioned so that light from the lamps (32) is adapted to fall on articles displayed. So that the illumination may be controlled by the switch (19) of the scale, wires (34 and 35) are shown (Figure V) connected to the terminals of the lamp socket in which lamp (13) on the customers' side of the scale is screwed. If desired, to facilitate the removal, a connector plug (36) may be provided in the circuit.

It is obvious that the structure herein described is well suited to fulfill the objects hereinbefore stated. It is understood, however, that the invention is susceptible to variation, modification and change within the spirit and scope of the subjoined claims.

Having described my invention, I claim:—

1. In combination with a weighing scale, a display fixture adapted to be supported on said scale for the reception of articles, said display fixture having a flat surface and integral portions shaped to match that portion of the weighing scale upon which the fixture is supported, brackets secured to said display fixture, lamps secured to said brackets, there being openings in said flat surface adjacent said lamps, a switch, means whereby said switch is closed by operation of said weighing scale, and wires leading from said switch to said lamps, one of said lamps secured to the said display fixture being positioned to permit rays of light therefrom to pass through said openings and illuminate articles supported on the flat surface of said fixture.

2. In combination with a weighing scale, a display fixture adapted to be supported on said scale for the reception of articles, said display fixture having a flat surface and integral portions shaped to match that portion of the weighing scale upon which the fixture is supported, brackets secured to said display fixture, lamps secured to said brackets, there being openings in said flat surface adjacent said lamps, a switch, means whereby said switch is closed by operation of said weighing scale, wires leading from said switch to said lamps, one of said lamps secured to the said display fixture being positioned to permit rays of light therefrom to pass through said openings and illuminate articles supported on the flat surface of said fixture, and a transparent sign in said fixture lying adjacent to one of said lamps and illuminated thereby.

RICHARD H. HERRON.